(12) United States Patent
Chen et al.

(10) Patent No.: US 8,461,528 B2
(45) Date of Patent: Jun. 11, 2013

(54) IMAGE RECORDING APPARATUS AND CONTROL METHOD THEREOF

(75) Inventors: Yen-Chao Chen, Tantz Shiang (TW); Jung-Ching Wang, Tantz Shiang (TW)

(73) Assignee: Asia Optical International Ltd., Totrola (VG)

( * ) Notice: Subject to any disclaimer, the term of this patent is extended or adjusted under 35 U.S.C. 154(b) by 925 days.

(21) Appl. No.: 12/497,899

(22) Filed: Jul. 6, 2009

(65) Prior Publication Data

US 2010/0102228 A1    Apr. 29, 2010

(30) Foreign Application Priority Data

Oct. 29, 2008 (TW) ............................. 97141703 A

(51) Int. Cl.
*H01L 31/00* (2006.01)
*G01J 5/00* (2006.01)
(52) U.S. Cl.
USPC ..................... 250/330; 250/338.1; 250/338.3
(58) Field of Classification Search
USPC .................................. 250/330, 338.1, 338.3
See application file for complete search history.

(56) References Cited

U.S. PATENT DOCUMENTS

| | | | | |
|---|---|---|---|---|
| 4,169,440 A * | 10/1979 | Taplin et al. | ................... | 123/679 |
| 4,751,571 A * | 6/1988 | Lillquist | ....................... | 348/164 |
| 5,309,147 A * | 5/1994 | Lee et al. | ....................... | 340/567 |
| 5,764,143 A * | 6/1998 | Buccola | ........................ | 340/521 |
| 6,137,407 A * | 10/2000 | Akagawa et al. | ............. | 340/552 |
| 6,288,395 B1 * | 9/2001 | Kuhnly et al. | ............ | 250/339.04 |
| 6,833,788 B1 * | 12/2004 | Smith et al. | ................... | 340/541 |
| 7,491,935 B2 * | 2/2009 | Burne et al. | .................. | 250/330 |
| 7,718,966 B2 * | 5/2010 | Ueno | ......................... | 250/338.4 |
| 2003/0090371 A1 * | 5/2003 | Teowee et al. | ............ | 340/426.24 |
| 2009/0001270 A1 * | 1/2009 | Striver | ....................... | 250/338.3 |
| 2011/0057105 A1 * | 3/2011 | Buckley et al. | ............ | 250/338.3 |

* cited by examiner

*Primary Examiner* — David Porta
*Assistant Examiner* — Mindy Vu
(74) *Attorney, Agent, or Firm* — Morris Manning & Martin LLP; Tim Tingkang Xia, Esq.

(57) ABSTRACT

Disclosed is an image recording apparatus comprising a temperature sensing module, a detecting module, an image capture module and a control unit. The control unit acquires an appropriate high threshold and an appropriate low threshold corresponding to an ambient temperature sensed by a temperature sensing module. The control unit outputs a high threshold voltage and a low threshold voltage to the detecting module for adjusting the sensitivity of the image recording apparatus to suit a variable ambient temperature properly.

17 Claims, 6 Drawing Sheets

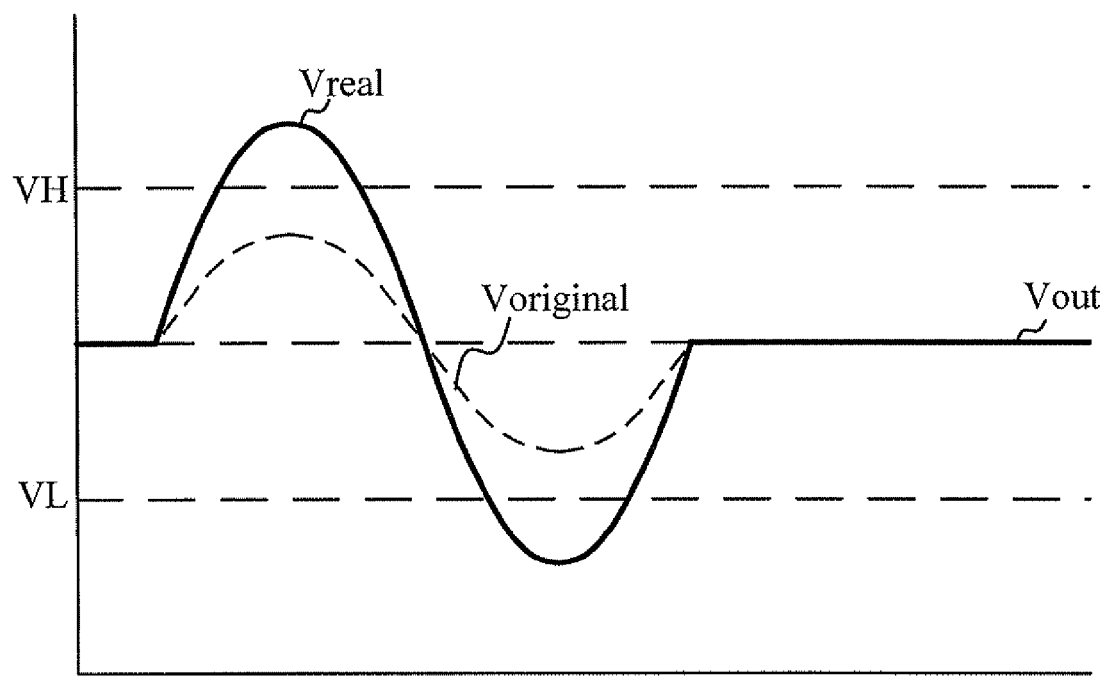
FIG. 1-A
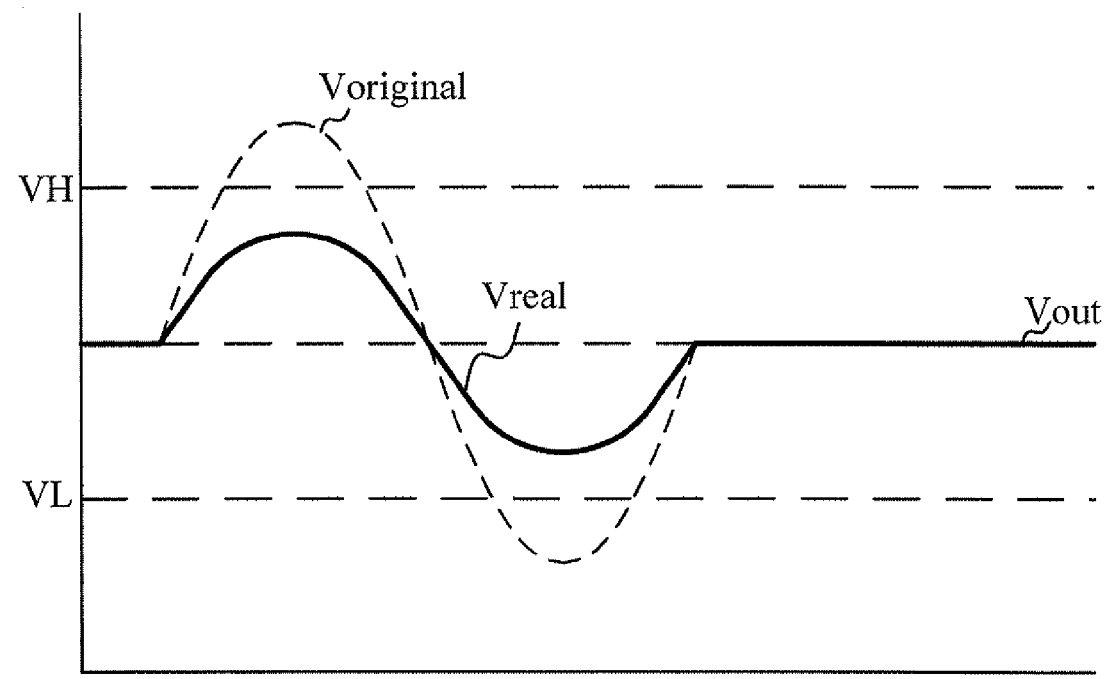
FIG. 1-B

| Temp (°C) | High Threshold | Low Threshold |
|---|---|---|
| 15 | 3.3V | 1.7V |
| 20 | 2.8V | 2.2V |
| 25 | 2.6V | 2.4V |
| 30 | 2.55V | 2.45V |

FIG. 3

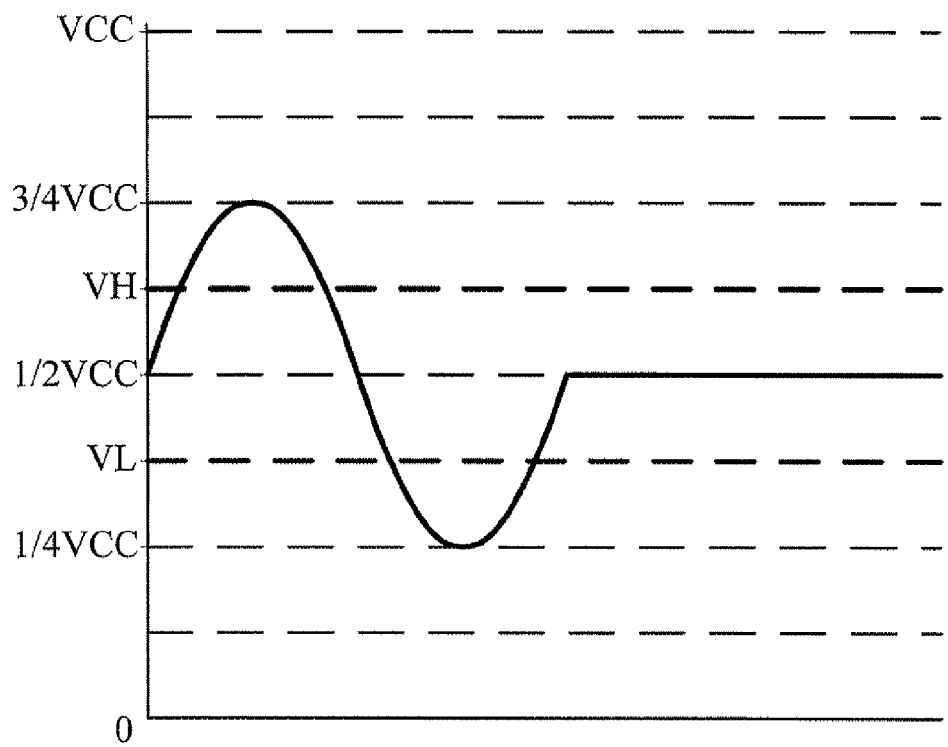
FIG. 5-A
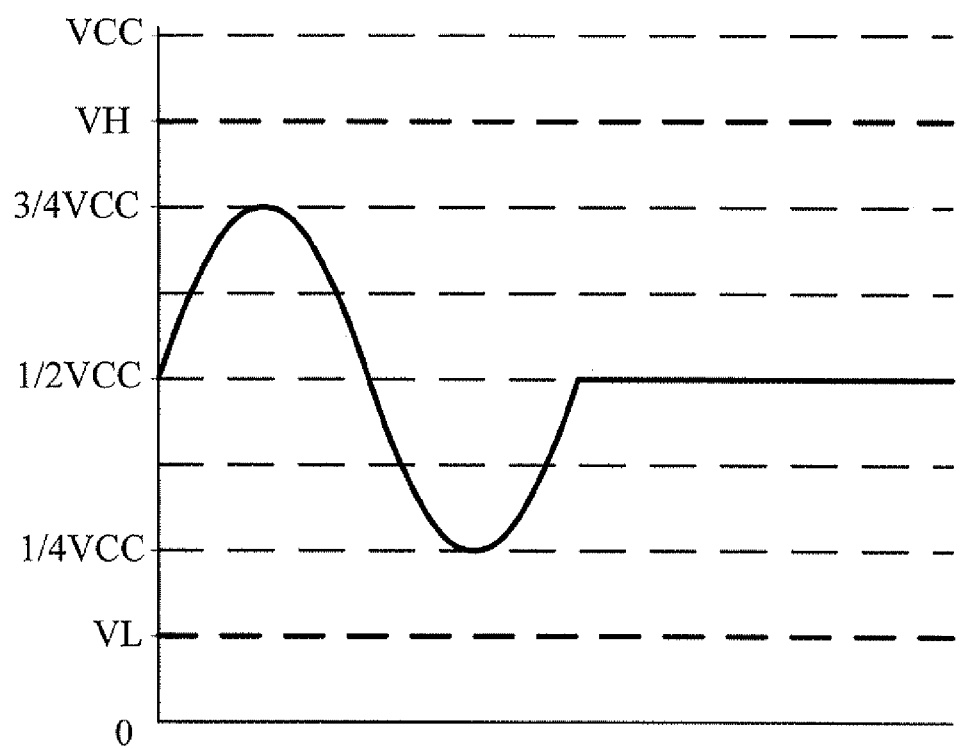
FIG. 5-B

IMAGE RECORDING APPARATUS AND CONTROL METHOD THEREOF

BACKGROUND OF THE INVENTION

1. Field of the Invention

The present invention generally relates to an image recording apparatus, and more particularly to an image recording apparatus capable of adjusting the sensitivity to suit the ambient temperature change.

2. Description of Prior Art

Observation or documentation in ecology is generally proceeded by an image recording apparatus and using a pyroelectric infrared sensor (PIR) as a detector. Once an animal enters the predetermined zone, the PIR measures that the difference of the ambient temperature change caused by the animal which exceeds a specific quantity, the image recording apparatus can be triggered to activate and start to record images or videos. According to prior arts, a comparing circuit may be utilized to compare the sensing signal of the PIR with a predetermined threshold. If the sensing signal is higher than a high threshold voltage or lower than a low threshold voltage, comparator in the comparing circuit will output a trigger signal. The image recording apparatus receives the trigger signal and then will enter into the work mode to proceed the image capturing operation.

However, the observation or documentation in ecology is generally proceeded in the field or in the jungle where the ambient temperature change is enormous. Comparing the sensing signal with the fixed high and low threshold voltages can result in that the comparing circuit becomes oversensitive or in the opposite way. In case that the body temperature of the animal is at 36 degrees Celsius and the ambient temperature rises from 25 degrees Celsius to 40 degrees Celsius, the temperature difference is 11 degrees Celsius when the ambient temperature is 25 degrees Celsius. Therefore, the animal enters the predetermined zone can be confirmed for sure. But when the ambient temperature rises to 40 degrees Celsius, the temperature difference becomes only 4 degrees Celsius. Even the animal entered the predetermined zone, the detector is now insensitive and the image recording apparatus may not be activated and the chance of observation or documentation is lost.

On the contrary, in case that the body temperature of the organism is at 25 degrees Celsius which is not the recording target object and the ambient temperature drops from 25 degrees Celsius to 15 degrees Celsius, there is no temperature difference when the ambient temperature is 25 degrees Celsius. Therefore, the image recording apparatus will not be activated. But when the ambient temperature drops to 15 degrees Celsius, the temperature difference becomes 10 degrees Celsius. The detector is now oversensitive and the image recording apparatus will be activated and result in a wrong shoot or a maloperation.

For solving the maloperation problem caused by the ambient temperature change as aforementioned, a thermistor is connected across the input terminal of threshold signal of the comparing circuit and the output terminal of the comparing circuit. By sensing the ambient temperature change with the thermistor to result in the resistance change, the gain of the comparator of the comparing circuit is adjusted by a voltage signal outputted from the thermistor.

Please refer to FIG. 1-A and FIG. 1-B, which depict oscillograms of output signals when the ambient temperatures are higher and lower according to the prior arts. The dotted lines represent the original output signals Voriginal of the comparing circuit without the thermistor. The full lines represent the real output signals Vreal of the comparing circuit with adding the thermistor to couple therewith. The condition is that the fixed high and low threshold voltages are used to compare with the sensing signal. As shown in FIG. 1-A when the ambient temperature is higher, the thermistor senses a higher temperature and generates the resistance change. The gain of the comparator is uplifted to make the real output signal Vreal higher than the original output signal Voriginal and therefore, to raise the sensitivity of the image recording apparatus. When the ambient temperature rises, the temperature difference becomes smaller and therefore, the original output signal Voriginal is too small to exceed the predetermined threshold voltages. However, uplifting the gain of the comparator with the thermistor to raise the sensitivity, the insensitivity issue can be solved when the animal enters the predetermined zone but the image recording operation is not proceeded. The correct image recording operation can be carried out.

On the contrary and as shown in FIG. 1-B, when the ambient temperature is lowered, the thermistor senses a lower temperature and generates the resistance change. The gain of the comparator is diminished to make the real output signal Vreal lower than the original output signal Voriginal and therefore, to reduce the sensitivity of the image recording apparatus. When the ambient temperature drops, the temperature difference becomes larger and therefore, the original output signal Voriginal is too large to exceed the predetermined threshold voltages. However, diminishing the gain of the comparator with the thermistor to reduce the sensitivity, the oversensitivity issue can be solved when the organism, which is not the recording target object, enters the predetermined zone and the image recording operation is proceeded. The image recording maloperation can be avoided.

According to the aforesaid prior arts, adjusting the gain of the comparator based on the ambient temperature change can provide the function of sensitivity adjustment. However, such gain uplifting or diminishing method of the comparator not only amplifies the output signal but also amplifies the noise at the same time. Consequently, the comparison result also contains more uncertainty.

SUMMARY OF THE INVENTION

For solving drawbacks of the prior art, an objective of the present invention is to provide an image recording apparatus, adapting the high and low threshold voltages to adjust the sensitivity to suit a variable ambient temperature.

For accomplishing the aforesaid objective of the present invention, the present invention provides an image recording apparatus capable of adjusting the sensitivity to suit a variable ambient temperature. The image recording apparatus comprises a temperature sensing module, a detecting module, an image capture module and a control unit. The temperature sensing module outputs a temperature sensing signal corresponding to an ambient temperature. The detecting module detects a predetermined zone and outputs a detecting result signal corresponding thereto. The detecting module further comprises a sensing element and a comparing circuit. The sensing element senses a change of the ambient temperature in the predetermined zone to output a sensing signal. The comparing circuit compares the sensing signal with a high threshold voltage and a low threshold voltage separately to output the detecting result signal corresponding to the sensing signal. The image capture module proceeds an operation of image capturing according to the detecting result signal. The control unit controls the operation of the image capture module according to the detecting result signal inputted from the detecting module and adapts the high threshold voltage and the low threshold voltage according to the temperature sensing signal. The control unit further comprises a process unit and a storage unit for saving threshold adaption data. When the temperature sensing signal is received, a high threshold and a low threshold obtained by looking up the threshold adaption data according to the temperature sensing signal are outputted for the high threshold voltage and the low threshold voltage.

The present invention also provides a control method of an image recording apparatus. The control method comprises steps described below: detecting the ambient temperature; acquiring the high threshold and the low threshold corresponding to the ambient temperature from threshold adaption data; and outputting the high threshold voltage and the low threshold voltage corresponding to the high threshold and the low threshold for adjusting the sensitivity of the detecting module of the image recording apparatus to suit the ambient temperature change.

BRIEF DESCRIPTION OF THE DRAWINGS

FIG. 1-A depicts an oscillogram of an output signal when the ambient temperature is higher according to the prior arts.

FIG. 1-B depicts an oscillogram of an output signal when the ambient temperature is lower according to the prior arts.

FIG. 3 shows a reference table of relationships about the ambient temperature, the high threshold and the low threshold.

FIG. 5-A depicts an oscillogram of a sensing signal inputted to the comparing circuit when image recording apparatus is highly sensitive.

FIG. 5-B depicts an oscillogram of a sensing signal inputted to the comparing circuit when image recording apparatus is low sensitive.

DETAILED DESCRIPTION OF THE INVENTION

Figure 2:
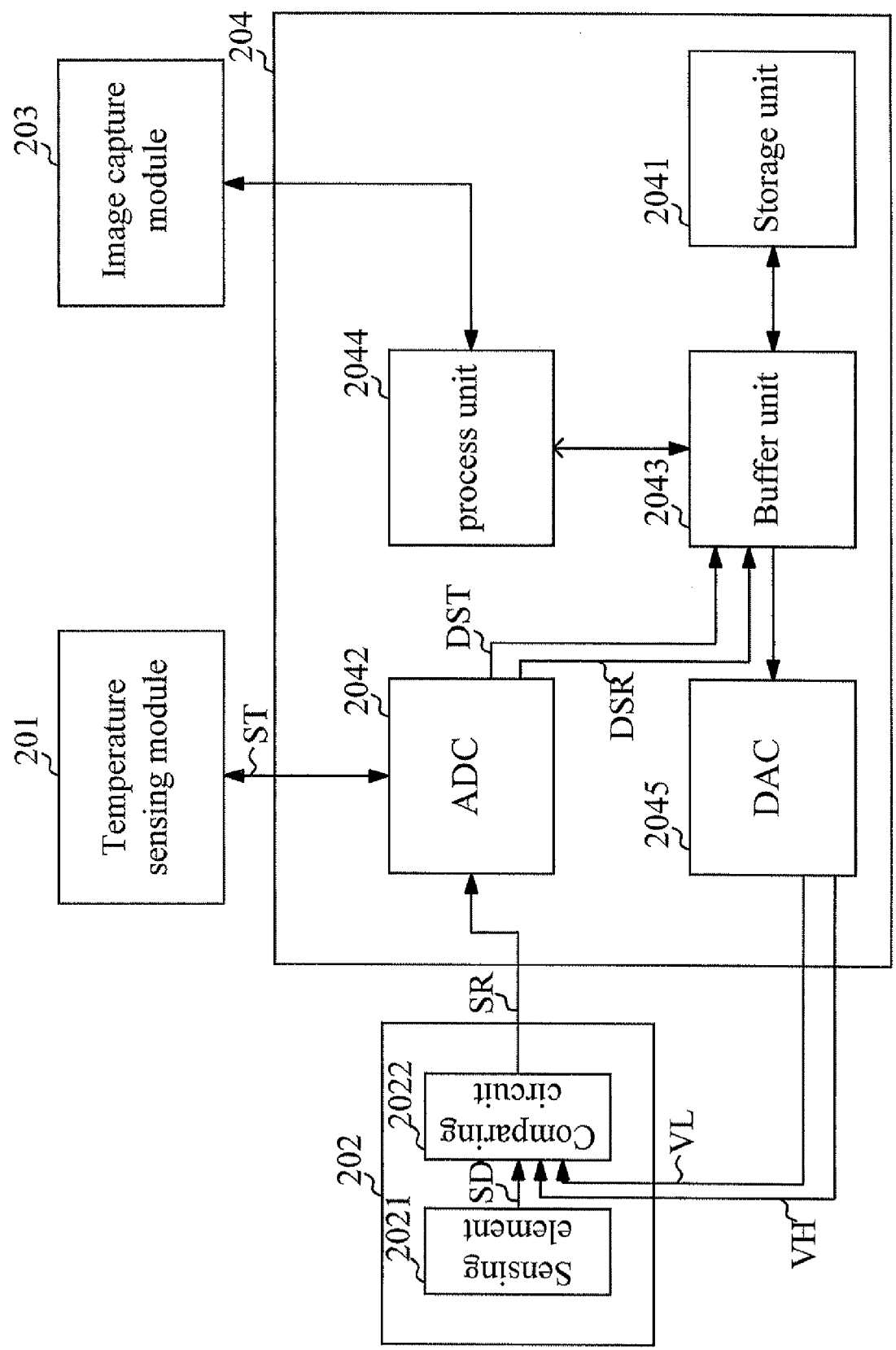
FIG. 2 depicts a block diagram of an image recording apparatus according to a first embodiment of the present invention.

Please refer to FIG. 2, which depicts a block diagram of an image recording apparatus according to a first embodiment of the present invention. The image recording apparatus according to the first embodiment of the present invention comprises a temperature sensing module 201, a detecting module 202, an image capture module 203 and a control unit 204. The temperature sensing module 201 is utilized to sense the ambient temperature and outputs a temperature sensing signal ST corresponding to the ambient temperature. In this embodiment, the temperature sensing module 201 can be a thermistor and the temperature sensing signal ST is a voltage signal. When the ambient temperature gets higher, the voltage of the temperature sensing signal ST gets higher accordingly. Therefore, the ambient temperature sensed by the thermistor can be obtained by knowing the voltage of the temperature sensing signal ST.

The detecting module 202 is utilized to detect a predetermined zone and outputs a detecting result signal SR corresponding thereto. The detecting module 202 further comprises a sensing element 2021. The sensing element 2021 is utilized to sense the ambient temperature change in the predetermined zone and outputs a sensing signal SD. The detecting module 202 also comprises a comparing circuit 2022. The comparing circuit 2022 is utilized to compare the sensing signal SD with a high threshold voltage VH and a low threshold voltage VL separately to output the detecting result signal SR corresponding to the sensing signal SD.

In this embodiment, the sensing element 2021 can be a pyroelectric infrared sensor (PIR). The pyroelectric infrared sensor detects the temperature change induced by the intensity change of the infrared rays in the predetermined zone to generate the corresponding current and outputs the corresponding voltage from the interior circuit. In case that an object enters the predetermined zone, the infrared rays radiated from the object can cause the intensity change of the infrared rays which is capable of inducing the temperature rising or dropping in the predetermined zone. The temperature rising or dropping can lead the pyroelectric infrared sensor to rise or drop the voltage of the outputted voltage signal correspondingly. More specifically, the difference between the ambient infrared intensity and the infrared intensity of the object entering the predetermined zone is larger, and the voltage of the outputted voltage signal is larger, too. Conversely, the smaller the aforesaid difference is, the smaller the aforesaid voltage will be.

The comparing circuit 2022 receives the high threshold voltage VH and the low threshold voltage VL for adjusting the sensitivity of the detecting module 202. More specifically, the comparing circuit 2022 is utilized to compare the sensing signal SD (a voltage signal) from the pyroelectric infrared sensor with the high threshold voltage VH and the low threshold voltage VL separately, and then to output the detecting result signal SR. In this embodiment, the detecting result signal SR is at high level (HI) when the sensing signal SD is higher then the high threshold voltage VH or lower than the low threshold voltage VL. Conversely, when the sensing signal SD is lower then the high threshold voltage VHI or higher than the low threshold voltage VL, the detecting result signal SR is at low level (LOW). In another embodiment of the present invention, the detecting result signal SR is at low level (LOW) when the sensing signal SD is higher then the high threshold voltage VH or lower than the low threshold voltage VL. Conversely, when the sensing signal SD is lower then the high threshold voltage VH or higher than the low threshold voltage VL, the detecting result signal SR is at high level (HI). The high threshold voltage VH and the low threshold voltage VL are provided and also controlled by the control unit 204 to adjust the sensitivity of the detecting module 202.

Please refer to FIG. 5-A, which depicts an oscillogram of the sensing signal SD inputted to the comparing circuit 2022 when image recording apparatus is highly sensitive. When the object is entering the predetermined zone, the sensing signal SD is a positive half sine wave which amplitude is ¾ VCC. And when the object is leaving the predetermined zone, the sensing signal SD is a negative half sine wave which amplitude is ¼ VCC. The control unit 204 adapts the high threshold voltage VH to be lower than the amplitude of the positive half sine wave and the low threshold voltage VL to be higher than the negative half sine wave. The comparing circuit 2022 will be triggered. The outputted detecting result signal SR is at high level (HI).

Otherwise, please refer to FIG. 5-B, which depicts an oscillogram of the sensing signal SD inputted to the comparing circuit 2022 when image recording apparatus is at low sensitive. When the object is entering the predetermined zone, the sensing signal SD is a positive half sine wave which amplitude is ¾ VCC. And when the object is leaving the predetermined zone, the sensing signal SD is a negative half sine wave which amplitude is ¼ VCC. The control unit 204 adapts the high threshold voltage VH to be higher than the amplitude of the positive half sine wave and the low threshold voltage VL to be lower than the negative half sine wave. Therefore, the comparing circuit 2022 will not be triggered. As aforementioned, under the same condition that the amplitude of sensing signal SD is constant, if the high threshold voltage VH is lower and the low threshold voltage VL is higher further, the amplitude of the inputted sensing signal SD for triggering the comparing circuit 2022 can be lower. Therefore, the sensitivity of the comparing circuit 2022 is raised. If the high threshold voltage VH is higher and the low threshold voltage VL is lower further, the amplitude of the inputted sensing signal SD for triggering the comparing circuit 2022 needs to be higher. Therefore, the sensitivity of the comparing circuit 2022 is reduced.

The image capture module 203 proceeds an operation of image capturing according to the detecting result signal SR. In this embodiment of the present invention, a photo capture device can be illustrated as being the image capture module 203. For example, a camera, a video recorder, a monitoring recorder, etc. can be illustrated. Under the condition of high level detecting result signal SR, the aforesaid photo capture device is enabled and proceeded with the operation of image capturing. Alternatively, the low level detecting result signal SR can be assumed to enable the photo capture device.

The control unit 204 controls the operation of the image capture module 203 according to the detecting result signal SR inputted from the detecting module 202. Furthermore, control unit 204 adapts the high threshold voltage VH and the low threshold voltage VL according to the temperature sensing signal ST. The control unit 204 further comprises a storage unit 2041, an analog-to-digital converter (ADC) 2042, a buffer unit 2043, a process unit 2044 and a digital-to-analog converter (DAC) 2045.

The storage unit 2041 saves threshold adaption data. The threshold adaption data comprises information of temperatures, high thresholds and low thresholds, as shown in FIG. 3, which is a reference table of relationships about the ambient temperature, the high threshold and the low threshold. The high thresholds and low thresholds are corresponding to the high threshold voltages and low threshold voltages in the reference table and the reference table provides proper high threshold voltages and low threshold voltages for suiting any ambient temperatures. For example, when the ambient temperature is 20 degrees Celsius, the corresponding high threshold voltage is 2.8 volt and the corresponding low threshold voltage is 2.2 volt. Therefore, the comparing circuit 2022 receives the high threshold voltage is 2.8 volt and the low threshold voltage is 2.2 volt. Furthermore, when the ambient temperature is 25 degrees Celsius, the corresponding high threshold voltage is 2.6 volt and the corresponding low threshold voltage is 2.4 volt. Therefore, the comparing circuit 2022 receives the high threshold voltage is 2.6 volt and the low threshold voltage is 2.4 volt.

The ADC 2042 is utilized to transform the temperature sensing signal ST and the detecting result signal SR into a digital temperature sensing signal DST and a digital detecting result signal DSR. More specifically, the temperature sensing signal ST and the detecting result signal SR received from the detecting module 202 are analog signals. The ADC 2042 transforms the temperature sensing signal ST and the detecting result signal SR into the digital temperature sensing signal DST and the digital detecting result signal DSR.

The buffer unit 2043 saves the digital temperature sensing signal DST from the ADC 2042 for the process unit 2044 for processing and saves the high threshold and the low threshold processed and outputted by the process unit 2044.

When the temperature sensing signal ST is received, the process unit 2044 acquires a high threshold and a low threshold corresponding to the temperature sensing signal ST from the threshold adaption data. And then, the control unit 204 outputs the high threshold voltage VH and the low threshold voltage VL corresponding to the high threshold and the low threshold respectively. More specifically, the process unit 2044 reads the digital temperature sensing signal DST from the buffer unit 2043 and derives a temperature value. Through looking up the reference table to find out the high threshold and the low threshold corresponding to the temperature value, the process unit 2044 saves the high threshold and the low threshold in the buffer unit 2043. In this embodiment, the process unit 2044 can be a Microcontroller. Alternatively, the process unit 2044 can be a DSP (Digital Signal Processor), a MCU (Micro Control Unit), a FPGA (Field-Programmable Gate Array) or a CPLD (Complex Programmable Logic Device).

The DAC 2045 is utilized to transform the high threshold and the low threshold saved in the buffer unit 2043 into the high threshold voltage VH and the low threshold voltage VL. More specifically, the DAC 2045 transforms the high threshold and the low threshold saved in the buffer unit 2043 into the high threshold voltage VH and the low threshold voltage VL and then outputs the high threshold voltage VH and the low threshold voltage VL to the comparing circuit 2022 of the detecting unit 202.

Figure 4:
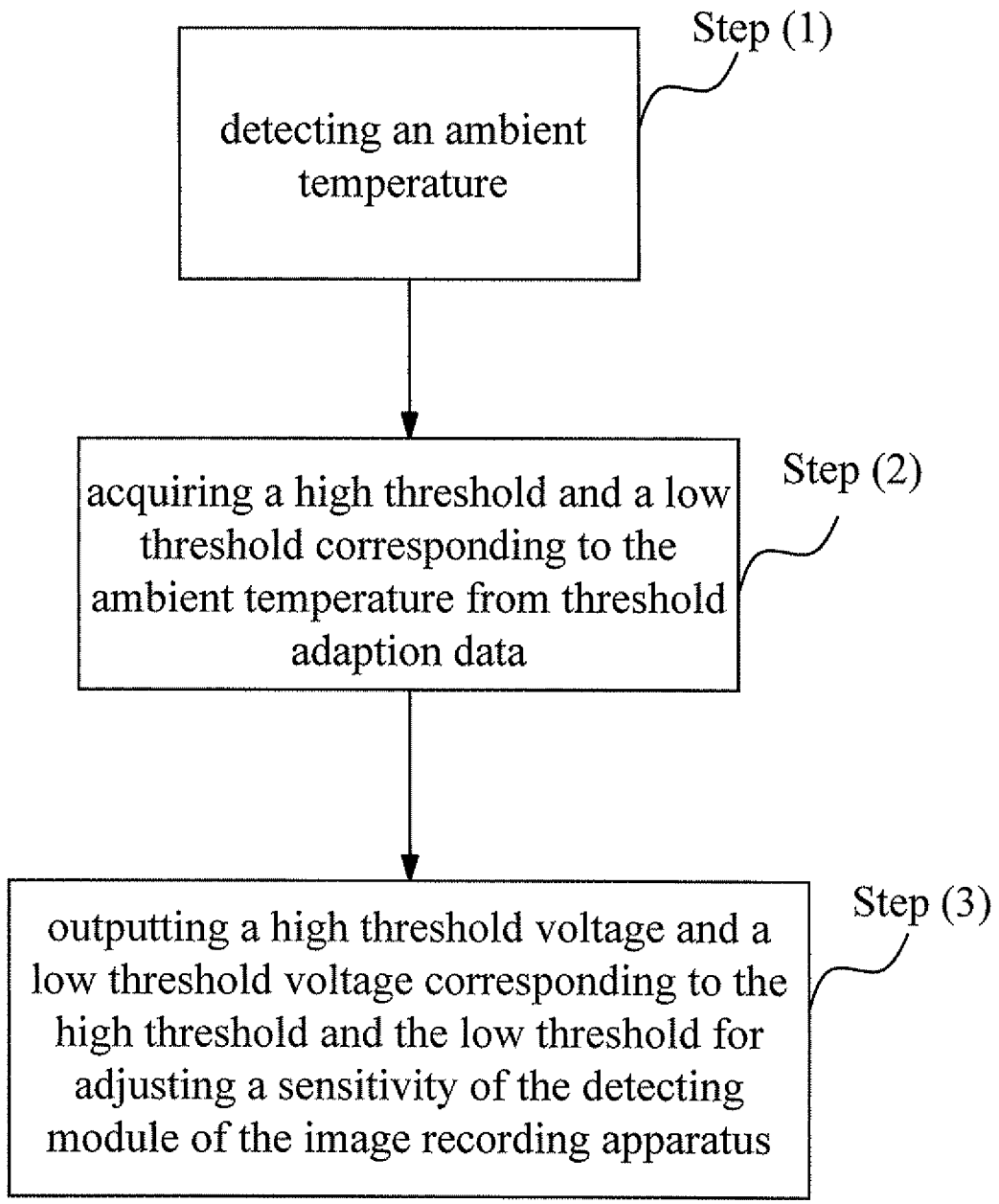
FIG. 4 depicts a flowchart of a control method of an image recording apparatus according to the present invention.

Please refer to FIG. 4, which depicts a flowchart of a control method of an image recording apparatus according to the present invention. The control method according to the present invention is capable of adjusting the sensitivity of the detecting unit 202 to suit the ambient temperature change correspondingly. The control method of the present invention comprises steps of:

Step (1), detecting an ambient temperature, the temperature sensing module 201 senses the ambient temperature and outputs the temperature sensing signal ST corresponding thereto in this step (1);

Step (2), acquiring a high threshold and a low threshold corresponding to the ambient temperature from threshold adaption data, the control unit 204 receives the temperature sensing signal ST and transforms the temperature sensing signal ST into a temperature value to acquire a high threshold and a low threshold corresponding to the temperature sensing signal ST from the threshold adaption data, i.e. the reference table of relationships about the ambient temperature, the high threshold and the low threshold in this step (2);

Step (3), outputting a high threshold voltage VH and a low threshold voltage VL corresponding to the high threshold and the low threshold for adjusting the sensitivity of the detecting module 202 of the image recording apparatus to suit the ambient temperature change. The control unit 204 outputs the high threshold voltage VH and a low threshold voltage VL through the DAC 2045 representing the high threshold and the low threshold to the detecting module 202, accordingly, to adjust the sensitivity of the image recording apparatus properly to suit the current ambient temperature in this step (3).

Figure 6:
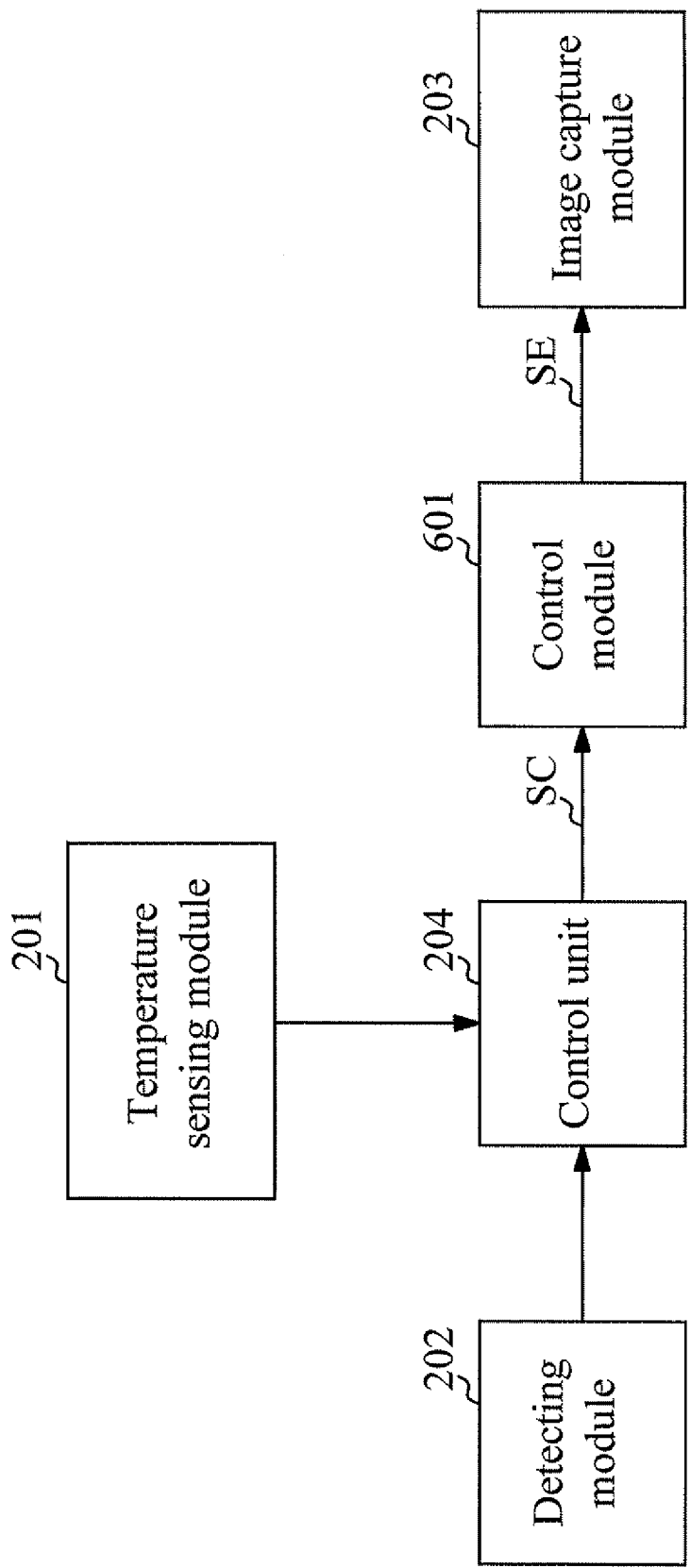
FIG. 6 depicts a block diagram of an image recording apparatus according to a second embodiment of the present invention.

Please refer to FIG. 6, which depicts a block diagram of an image recording apparatus according to a second embodiment of the present invention. Differences of the image recording apparatus according to the second embodiment from the aforesaid description in the first embodiment utilizes a control module 601 to be coupled to the control unit 204. The control module 601 receives a control signal SC and generates an enable signal SE corresponding to the control signal SC to enable the image capture module 203. The enable signal SE is generated according to the detecting result signal SR. Once the detecting result signal SR is outputted as a trigger for enabling the image capture module 203, the control unit 204 will generates the enable signal SE to enable the image capture module 203 to proceed corresponding operations, such as, an activation of the image recording apparatus or an operation of image capturing.

For example, when the detecting result signal SR outputted by the detecting module 202 is at high level, the control unit 204 sends the control signal SC corresponding to the high level to the control module 601. The control module 601 controls the image capture module 203 to be activated or to proceed the operation of image capturing. The control module 601 can comprise a DSP (Digital Signal Processor).

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An image recording apparatus, comprising:
   a temperature sensing module, outputting a temperature sensing signal corresponding to an ambient temperature;
   a detecting module, detecting a predetermined zone and outputting a detecting result signal corresponding thereto, wherein the detecting module further comprises a sensing element, sensing a change of the ambient temperature in the predetermined zone to output a sensing signal and a comparing circuit, comparing the sensing signal with a high threshold voltage and a low threshold voltage separately to output the detecting result signal corresponding thereto;
   an image capture module, proceeding an operation of image capturing according to the detecting result signal; and
   a control unit, controlling the operation of the image capture module according to the detecting result signal inputted from the detecting module and adapting the high threshold voltage and the low threshold voltage according to the temperature sensing signal,
   wherein the control unit further comprises a process unit, and a storage unit saving threshold adaption data, when the temperature sensing signal is received, a high threshold and a low threshold obtained by looking up the threshold adaption data according to the temperature sensing signal are outputted for the high threshold voltage and the low threshold voltage.

2. The image recording apparatus of claim 1, further comprising:
   an analog-to-digital converter (ADC), transforming the temperature sensing signal and the detecting result signal into a digital temperature sensing signal and a digital detecting result signal;
   a buffer unit, saving the digital temperature sensing signal outputted from the ADC for the process unit for processing and saving the high threshold and the low threshold processed and outputted by the process unit; and
   a digital-to-analog converter (DAC), transforming the high threshold and the low threshold saved in the buffer unit into the high threshold voltage and the low threshold voltage for outputs.

3. The image recording apparatus of claim 1, wherein the sensing signal is a voltage.

4. The image recording apparatus of claim 1, wherein the detecting result signal is a high level signal or a low level signal.

5. The image recording apparatus of claim 4, wherein the detecting result signal is the high level signal when the sensing signal is higher than the high threshold voltage or lower than the low threshold voltage, and the detecting result signal is the low level signal when the sensing signal is lower than the high threshold voltage and higher than the low threshold voltage.

6. The image recording apparatus of claim 4, wherein the detecting result signal is the low level signal when the sensing signal is higher than the high threshold voltage or lower than the low threshold voltage, and the detecting result signal is the high level signal when the sensing signal is lower than the high threshold voltage and higher than the low threshold voltage.

7. The image recording apparatus of claim 1, wherein the threshold adaption data comprises information of temperatures, high thresholds and low thresholds.

8. The image recording apparatus of claim 1, wherein the sensing element is a pyroelectric infrared sensor.

9. The image recording apparatus of claim 1, wherein the control unit is a microprocessor, a digital signal processor (DSP), a Field Programmable Gate Array (FPGA) or a complex programmable logic device (CPLD).

10. The image recording apparatus of claim 1, wherein the temperature sensing signal is a voltage signal.

11. The image recording apparatus of claim 1, further comprising a control module, coupled with the control unit, receiving a control signal outputted from the control unit, generating an enabling signal according to the control signal to enable the image capture module.

12. The image recording apparatus of claim 11, wherein the control module is a digital signal processor.

13. A control method of an image recording apparatus, comprising steps of:
   (1) generating a temperature sensing signal corresponding to an ambient temperature;
   (2) sensing a change of the ambient temperature in a predetermined zone to output a sensing signal;
   (3) comparing the sensing signal with a high threshold voltage and a low threshold voltage separately to output a detecting result signal corresponding thereto;
   (4) proceeding an operation of image capturing according to the detecting result signal; and
   (5) adapting the high threshold voltage and the low threshold voltage according to the temperature sensing signal, in which a high threshold and a low threshold obtained by looking up threshold adaption data according to the temperature sensing signal are outputted for the high threshold voltage and the low threshold voltage.

14. The control method of claim 13, further comprising a step of transforming the temperature sensing signal into a temperature value and obtaining the high threshold and the low threshold corresponding to the temperature value from the threshold adaption data by a control unit during step (4).

15. The control method of claim 13, further comprising a step of outputting the high threshold voltage and the low threshold voltage corresponding to the high threshold and the low threshold to a detecting module by a control unit during step (4).

16. The control method of claim 15, wherein the high threshold voltage and the low threshold voltage are outputted to the detecting module via a digital-to-analog converter (DAC).

17. The control method of claim 13 wherein the threshold adaption data comprises information of temperatures, high thresholds and low thresholds.

\* \* \* \* \*